United States Patent
Foley et al.

(10) Patent No.: US 11,969,877 B1
(45) Date of Patent: Apr. 30, 2024

(54) PROTECTING PERSONNEL USING SPRING-ASSISTED, DEPLOYABLE BALLISTIC SHIELD

(71) Applicant: Howe & Howe Inc., Waterboro, ME (US)

(72) Inventors: Timothy Merlin Foley, Lyman, ME (US); Michael J. Zagorianakos, Gorham, ME (US); Matthew Gregory Williams, Kennebunk, ME (US); Zachary Edward Sawyer, Alfred, ME (US); Caroline Ruby Bills, Windham, ME (US)

(73) Assignee: Howe & Howe Inc., Waterboro, ME (US)

( * ) Notice: Subject to any disclaimer, the term of this patent is extended or adjusted under 35 U.S.C. 154(b) by 0 days.

(21) Appl. No.: 17/994,927

(22) Filed: Nov. 28, 2022

(51) Int. Cl.
  *F41H 5/06* (2006.01)
  *B25J 11/00* (2006.01)
  *F41H 5/013* (2006.01)

(52) U.S. Cl.
  CPC .......... *B25J 11/002* (2013.01); *F41H 5/013* (2013.01); *F41H 5/06* (2013.01)

(58) Field of Classification Search
  CPC ..... F41H 5/14; F41H 7/02; F41H 5/06; F41H 5/013
  See application file for complete search history.

(56) References Cited

U.S. PATENT DOCUMENTS

| | | | | |
|---|---|---|---|---|
| 3,137,205 A | * | 6/1964 | Berge | F41H 5/16 89/36.02 |
| 3,590,685 A | * | 7/1971 | Lane | F41H 5/14 109/49.5 |
| 7,152,517 B1 | * | 12/2006 | Ivey | B63G 9/02 89/36.01 |
| 7,836,811 B1 | * | 11/2010 | Gardner | F41A 27/24 180/9.1 |
| 7,841,269 B1 | * | 11/2010 | Jacobs | F41H 5/013 89/36.01 |
| 8,015,910 B1 | * | 9/2011 | Fuqua | F41H 5/14 89/36.01 |
| 8,356,541 B2 | | 1/2013 | Schneider et al. | |

(Continued)

FOREIGN PATENT DOCUMENTS

CN  114029971  2/2022

OTHER PUBLICATIONS

John Schwartze, "Ring Power's Armored Door-Kicker Delivery System, The Rook" Recoil Issue 40; Nov. 30, 2018; downloaded Nov. 29, 2022 from https://www.recoilweb.com/ring-powers-armored-door-kicker-delivery-system-the-rook-143743.html.

(Continued)

*Primary Examiner* — Joshua E Freeman
(74) *Attorney, Agent, or Firm* — BainwoodHuang

(57) ABSTRACT

A technique for facilitating deployment and stowing of a ballistic shield on a vehicle includes providing a central armored panel having a hinged connection to a base, which may be coupled to or integral with the vehicle. The hinged connection includes an axle and a set of torsion springs configured to exert a lifting torque on the central armored panel relative to the base, such that the central armored panel is movable about the hinged connection for assuming both an upright, deployed position and a laid-down, stowed position.

20 Claims, 10 Drawing Sheets

(56) References Cited

U.S. PATENT DOCUMENTS

| | | | | |
|---|---|---|---|---|
| 8,430,014 B2* | 4/2013 | Burton | ............... | F41H 7/02 |
| | | | | 89/930 |
| 8,800,695 B2* | 8/2014 | Couture | ............ | B25J 5/005 |
| | | | | 180/9.5 |
| 9,637,186 B1 | 5/2017 | Goldenberg et al. | | |
| 9,770,825 B2* | 9/2017 | Goldenberg | ........ | B62D 55/075 |
| 10,393,489 B1 | 8/2019 | Burmeister et al. | | |
| 11,077,558 B2 | 8/2021 | Ohm et al. | | |
| 11,204,222 B1* | 12/2021 | Boucher | ............ | F41H 5/18 |
| 2009/0120273 A1* | 5/2009 | Eckdahl | ............ | F41H 7/02 |
| | | | | 89/1.1 |
| 2009/0308238 A1* | 12/2009 | Schwartz | ............ | F41J 13/00 |
| | | | | 89/36.02 |
| 2019/0093992 A1* | 3/2019 | Zhang | ............ | F41H 7/044 |
| 2020/0025525 A1* | 1/2020 | Spransy | ............ | F41H 5/08 |
| 2020/0393216 A1* | 12/2020 | Maji | ............ | F41H 5/02 |
| 2022/0063533 A1* | 3/2022 | Lowery | ............ | B60R 19/38 |

OTHER PUBLICATIONS

Tonut Ungureanu; "SWAT-Bot Is a Mid-Sized Robot That Keeps Villains at Distance" Autoevolution; Dec. 29, 2014; downloaded Nov. 29, 22 from https://www.autoevolution.com/news/swat-bot-is-a-mid-sized-robot-that-keeps-villains-at-distance-video-90534.html.

* cited by examiner

PROTECTING PERSONNEL USING SPRING-ASSISTED, DEPLOYABLE BALLISTIC SHIELD

BACKGROUND

Law enforcement and military operations involving active shooters can expose personnel to high risk of death and bodily harm. To reduce this risk, various ballistic shields have been developed. Some ballistic shields are designed to be carried by personnel directly for providing individual protection, whereas others may be attached to vehicles.

For example, the RBS1 Robotic Ballistic Shield, available from Howe & Howe Inc., of Waterboro, Maine, is a small, robotic, tracked vehicle having a foldable ballistic shield that can be deployed on site to protect personnel standing behind the vehicle. The shield can withstand many ammunition hits and can be advanced toward an active shooter, improving chances of disabling the shooter while reducing risk to personnel and bystanders.

SUMMARY

Prior designs like the RBS1 use gas springs to assist personnel when deploying and stowing a ballistic shield, e.g., by applying a force that tends to raise the shield to an upright position. Although gas springs are sufficient for the RBS1, they provide little help for heavier shields, such as larger shields or those equipped with heavier armor, e.g., armor rated for NIJ (National Institute of Justice) Standard III or higher. Also, the location of gas springs has generally been toward the front of the vehicle, at least partially in front of the shield, where the gas springs may be vulnerable to ammunition hits. What is needed, therefore, is a heavier-duty and more protected solution for assisting personnel in raising and lowering a ballistic shield on a vehicle.

To address this need at least in part, an improved technique for facilitating deployment and stowing of a ballistic shield on a vehicle includes providing a central armored panel having a hinged connection to a base, which may be coupled to or integral with the vehicle. The hinged connection includes an axle and a set of torsion springs configured to exert a lifting torque on the central armored panel relative to the base, such that the central armored panel is movable about the hinged connection for assuming both an upright, deployed position and a laid-down, stowed position.

Advantageously, the axle and set of torsion springs can be made arbitrarily strong for supporting ballistic shields of any reasonable size and weight, enabling personnel to raise and lower the shield without excessive effort, preferably by only a single person. Also, the axle and the set of torsion springs may be placed where they are not vulnerable to ammunition strikes.

Certain embodiments are directed to a deployable ballistic shield for a vehicle, including a base configured to attach to the vehicle and a central armored panel having a hinged connection to the base. The hinged connection includes an axle and a set of torsion springs configured to exert a lifting torque on the central armored panel relative to the base. The central armored panel is movable about the hinged connection for assuming both an upright, deployed position and a laid-down, stowed position. The deployable ballistic shield further includes a set of lateral armored panels coupled to the central armored panel. Each of the set of lateral armored panels is movable for assuming a laterally deployed position and a centrally stowed position.

In some examples, the base includes a vertical support, and the axle is attached to the base at a top region of the vertical support.

In some examples, the set of torsion springs is configured to exert a positive amount of the lifting torque throughout a full range of movement between the upright, deployed position and the laid-down, stowed position.

In some examples, the deployable ballistic shield further includes a set of latches configured to lock the central armored panel in the upright, deployed position.

In some examples, the set of latches includes first and second latches configured to engage automatically when the central armored panel is moved from the laid-down, stowed position to the deployed position.

In some examples, the deployable ballistic shield further includes a latch release configured to release the set of latches, the latch release including a set of cables that runs from the set of latches to an area behind the central armored panel when the central armored panel is in the upright, deployed position.

In some examples, the deployable ballistic shield further includes a set of support members, each support member having a first end coupled to the base and a second end constructed and arranged to assume (i) a first position in which the second end is coupled to the central armored panel and (ii) a second position in which the second end is coupled to the base.

In some examples, the second end is constructed and arranged to attach to the respective lateral armored panel at multiple locations, the locations including a first location at which the respective lateral armored panel is substantially parallel to the central armored panel and a second location in which the respective lateral armored panel is angled backwards relative to the central armored panel.

In some examples, the deployable ballistic shield further includes a respective locking bolt constructed and arranged to lock each of the set of lateral armored panels in the laterally deployed position.

In some examples, each of the set of lateral armored panels is movable relative to the central armored panel about a respective lateral hinged connection.

In some examples, the deployable ballistic shield further includes a top armored panel having a top hinged connection to the central armored panel, the top armored panel constructed and arranged to provide ballistic shielding above the central armored panel.

In some examples, each of the set of lateral armored panels includes a first armored portion hingedly attached to the central armored panel, a second armored portion hingedly attached to the first armored portion, and a third armored portion hingedly attached to the second armored portion.

In some examples, the third armored portion is constructed and arranged to assume both (i) a deployed position in which the third armored portion is folded down from the second armored portion to provide ballistic shielding below the second armored portion and (ii) a stowed position in which the third armored portion is folded up and secured to the second armored portion.

In some examples, at least one panel of the set of lateral armored panels includes a vertical track disposed at an outside edge of the panel, the vertical track providing multiple vertical locations at which to attach accessories.

In some examples, the accessories to be attached to the vertical track include at least one of a gun rest or a hand grip or strap.

Other embodiments are directed to a vehicle having a deployable ballistic shield. The vehicle includes a base formed on one or more surfaces of the vehicle and a central armored panel having a hinged connection to the base. The hinged connection includes an axle and a set of torsion springs configured to exert a lifting torque on the central armored panel relative to the base. The central armored panel is movable about the hinged connection for assuming both an upright, deployed position and a laid-down, stowed position. The vehicle further includes a set of lateral armored panels coupled to the central armored panel. Each of the set of lateral armored panels is movable for assuming a laterally deployed position and a centrally stowed position.

Still further embodiments may include a method of deploying a ballistic shield on a vehicle, a method of stowing a ballistic shield on a vehicle, and various assemblies, sub-assemblies, and components as disclosed herein.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Figure 1:
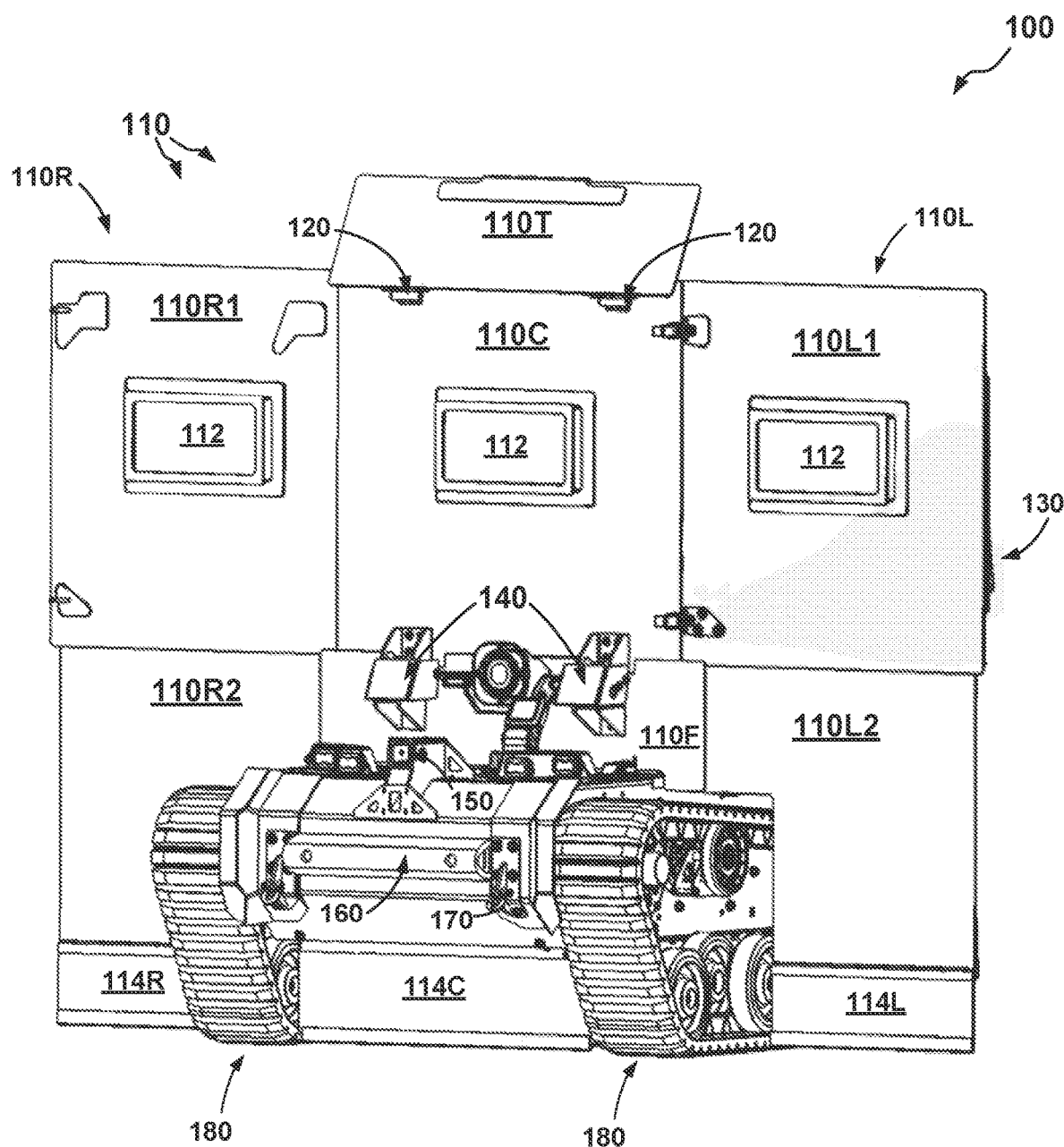
FIG. 1 is a front-left isometric view of an example vehicle with a deployable ballistic shield in accordance with the disclosure.

Embodiments of the improved technique will now be described. One should appreciate that such embodiments are provided by way of example to illustrate certain features and principles but are not intended to be limiting.

An improved technique for facilitating deployment and stowing of a ballistic shield on a vehicle includes providing a central armored panel having a hinged connection to a base, which may be coupled to or integral with the vehicle. The hinged connection includes an axle and a set of torsion springs configured to exert a lifting torque on the central armored panel relative to the base, such that the central armored panel is movable about the hinged connection for assuming both an upright, deployed position and a laid-down, stowed position.

In typical application, the vehicle may be transported with the ballistic shield in the stowed position. For example, the vehicle may be loaded onto a truck, towed, or driven under its own power with the ballistic shield folded back and stowed. When needed for protecting personnel, the ballistic shield may be deployed on site, e.g., by raising the ballistic shield from the stowed position to the upright position and unfolding the ballistic shield. The vehicle may then be driven, e.g., under remote control by personnel, and advanced toward a threat with the front of the vehicle facing toward the threat and the personnel remaining safely behind the ballistic shield.

In an example, the vehicle is a fully electric vehicle, i.e., one that is powered by batteries and electric motors. An electric vehicle may be preferred in some examples, as it provides quieter and stealthier performance than is possible using an equivalently capable gasoline or diesel-powered vehicle.

FIGS. 1-3, 4a and 4b show various views of an example vehicle 100. The vehicle is preferably a tracked vehicle and includes first and second tracks 180. The vehicle 100 is equipped with a deployable ballistic shield 110, which is shown in an upright, deployed position in FIGS. 1-3, in an upright and folded position in FIG. 4a, and in a laid-down, stowed position in FIG. 4b.

The ballistic shield 110 includes multiple armored panels, such as a central armored panel 110C, a top armored panel 110T, a front armored panel 110F, a left lateral armored panel 110L, and a right lateral armored panel 110R. One or more of the left, center, and right armored panels may include a bulletproof window 112, which may be composed of bulletproof glass or some other transparent, impact-resistant material. Alternatively, the windows 112 may be omitted and a camera system may be used in their place, e.g., with a video monitor located on the back of the shield 110 or behind the shield 110. In an example, the left and right armored panels 110L and 110R each include multiple armored portions that are mechanically coupled to enable the ballistic shield 110 to fold neatly (FIGS. 4a and 4b) so that it occupies a much smaller space and can be transported conveniently.

In some examples, the ballistic shield 110 further includes flexible skirts, such as a left skirt 114L, a central skirt 114C, and a right skirt 114R (FIG. 1). The skirts 114L, 114C, and 114R are preferably flexible enough to deflect as the vehicle 100 is driven over uneven terrain, yet strong enough to provide substantial protection against gunfire. Although only a single central skirt 114C is shown, some embodiments may include multiple central skirts 114C, which may be arranged in line behind the depicted skirt 114C underneath a main body of the vehicle 100.

In an example, the central, top, front, left and right armored panels 110C, 110T, 110F, 110L, and 110R, respectively, are rated for NIJ (National Institute of Justice) Standard III or higher. Ratings on the flexible skirts may be NIJ Standard III or lower.

Figure 2:
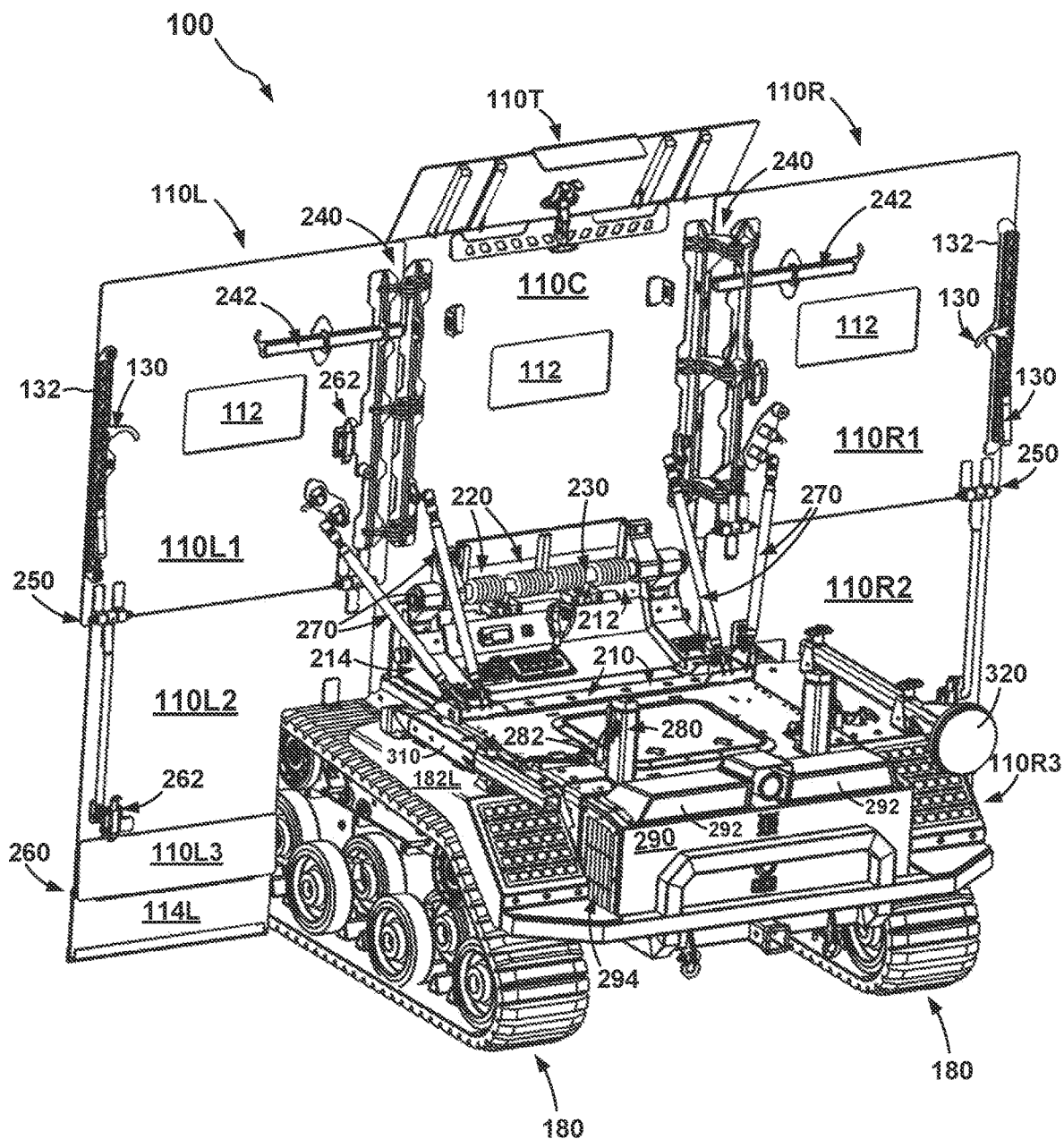
FIG. 2 is a rear-left isometric view of the vehicle of FIG. 1.

As best seen in FIG. 2, the third armored portions 110L3 and 110R3 fold back and up on hinges 260 and may be retained in their folded-up positions by locking element 262. It is generally advisable that the vehicle 100 be driven with the armored portions 110L3 and 110R3 folded up, and that the armored portions 110L3 and 110R3 be folded down only on even terrain or when needed for protection.

As further seen in FIG. 2, the central armored panel 110C is configured to fold backwards about an axle 230, which is coupled to a base plate 210 via a vertical support 212. The vertical support 212 is firmly attached to the base plate 210 via gussets 214. For example, the vertical support 212, base plate 210, and gussets 214 may be formed as a single welded piece. One should appreciate that the "base" as described herein is not limited to the base plate 110 but rather may be any surface of the vehicle 100 having a fixed location on the vehicle relative to the base plate 210. When raised to the upright position, the central armored panel 110C becomes locked to the vertical support 212 by action of latches 140 (FIG. 1), such as a pair of latches. The latches 140 firmly hold the ballistic shield 110 in the upright position and prevent the shield from falling backwards, thus allowing personnel to safely let go of the shield. The latches 140 themselves prevent the shield from falling forwards.

Torsion springs 220 disposed around the axle are configured to apply a lifting torque to the central armored panel 110C relative to the base plate 210. The lifting torque tends to lift the central armored panel 110C towards the upright position and thus assists personnel in raising and lowering the ballistic shield 110, which may otherwise be too heavy to be managed by persons of typical strength (a typical mass of the shield is over 300 kg). In common examples, the lifting torque is not sufficient to lift the ballistic shield 110 on its own but is rather sufficient only to assist personnel, such that the shield can normally be handled by just one or two persons.

The lateral panels 110L and 110R may be held open in various ways. In some examples, a locking bolt 242 (FIG. 2) may be used to hold each lateral panel fully open. Sometimes, it may be desirable to angle back the lateral panels 110L and 110R, however. The fasteners 240 preferably provide some degree of friction (via tightening or loosening) to accomplish such orientation. For example, the fasteners 240 may have a double-shear design that employs a friction washer.

Panels may be further supported by support members 270. For example, one or more inner support members may run between the base plate 210 and the central armored panel 110C for providing additional support that maintains the ballistic shield 110 in the upright position. One or more outer support members may run between the base plate 210 and the lateral panels, i.e., one support member to the left panel 110L and another support member to the right panel 110R. As will be described more fully below, the outer support members can fix the positions of the lateral panels 110L and 110R in either a fully open position or in a partially folded-back position.

Other notable features in FIG. 2 include left and right fenders 182L and 182R, which help to protect personnel from tracks 180, and a radiator 290. The radiator 290 is part of a cooling system for cooling electrical components of the vehicle, such as batteries, motors, DC-to-DC converters, and the like. The radiator 290 has an air intake 292 at the top-rear of the radiator and an air exhaust 294 at the sides. This placement of the exhaust 294 at the sides of the radiator is believed to be less distracting to personnel behind the vehicle.

Still other notable features of FIG. 2 include a securing member 280 and a bump stop 282. Securing member 280 is configured to secure the ballistic shield 110 in the stowed position, and bump stop 282 provides cushioning when the shield 110 is stowed or moved to the stowed position. In addition, accessories 130, such as gun rests, straps, or handles may be provided on tracks 132 disposed near outside edges of the lateral panels 110L and 110R. As described further below, the accessories 130 may be moved up and down along the tracks 132 for optimal placement.

Figure 3:
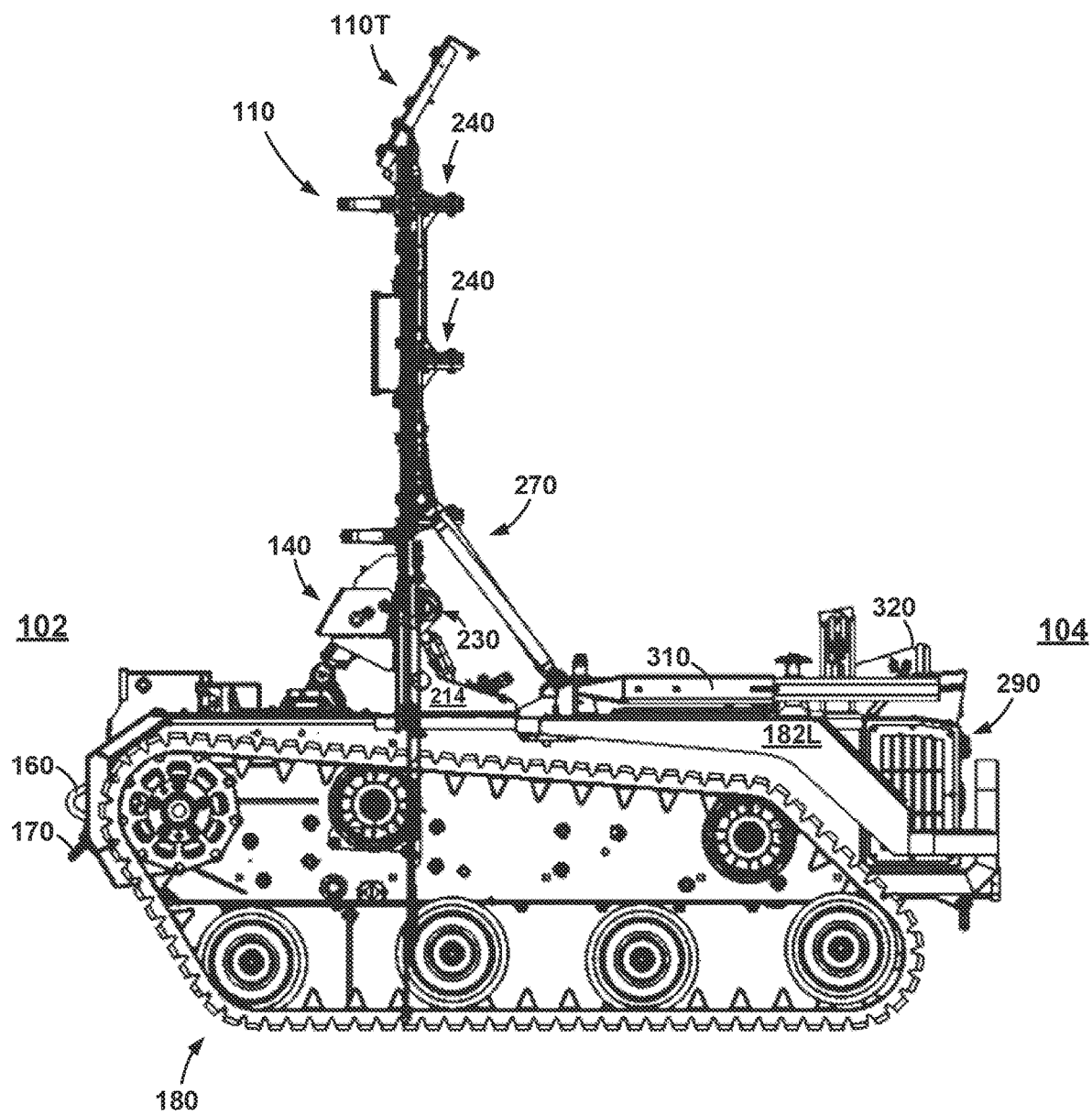
FIG. 3 is a left-side isometric view of the vehicle of FIG. 1.

Other notable features shown in FIG. 1 include a front accessories hitch 150, front armor 160, and a tiedown point 170. The front accessories hitch 150 provides a mounting location for accessories, such as a harpoon 310 or a door breacher 320 (FIG. 3). In an example, tiedown point 170 can be connected to a chain, which may be used to attach the vehicle 100 to an accessory, such as the harpoon 310.

The side view of FIG. 3 identifies a front 102 and a rear 104 of the vehicle 100. These identifiers provide directional references for indications of forward and backward directions as described herein. FIG. 3 further shows the harpoon 310 and door breacher 320 in their stowed positions.

Figure 4A:
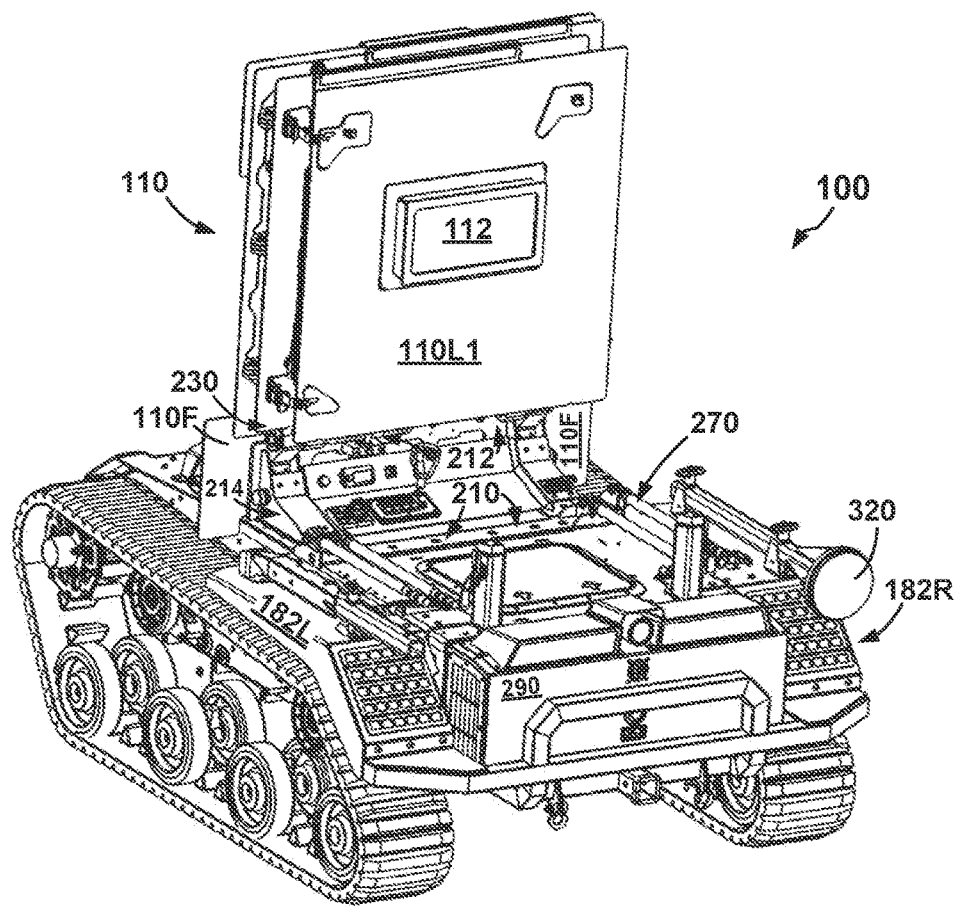
FIGS. 4a and 4b are rear-left isometric views of the vehicle of FIG. 1, showing the ballistic shield in an upright position with its lateral panels folded in (FIG. 4a) and showing the ballistic shield folded down and in a stowed position (FIG. 4b).

FIG. 4a shows the ballistic shield 110 in an upright and folded-in condition. Here, the third armored portions 110L3 and 110R3 have been folded up and secured to the respective second armored portions 110L2 and 110R2. Also, the second armored portions 110L2 and 110R2 have been folded up about hinges 250 and secured to the respective first armored portions 110L1 and 110R1. Finally, the folded-up lateral panels 110L and 110R are folded in, over the central panel 110C, and secured.

Figure 4B:
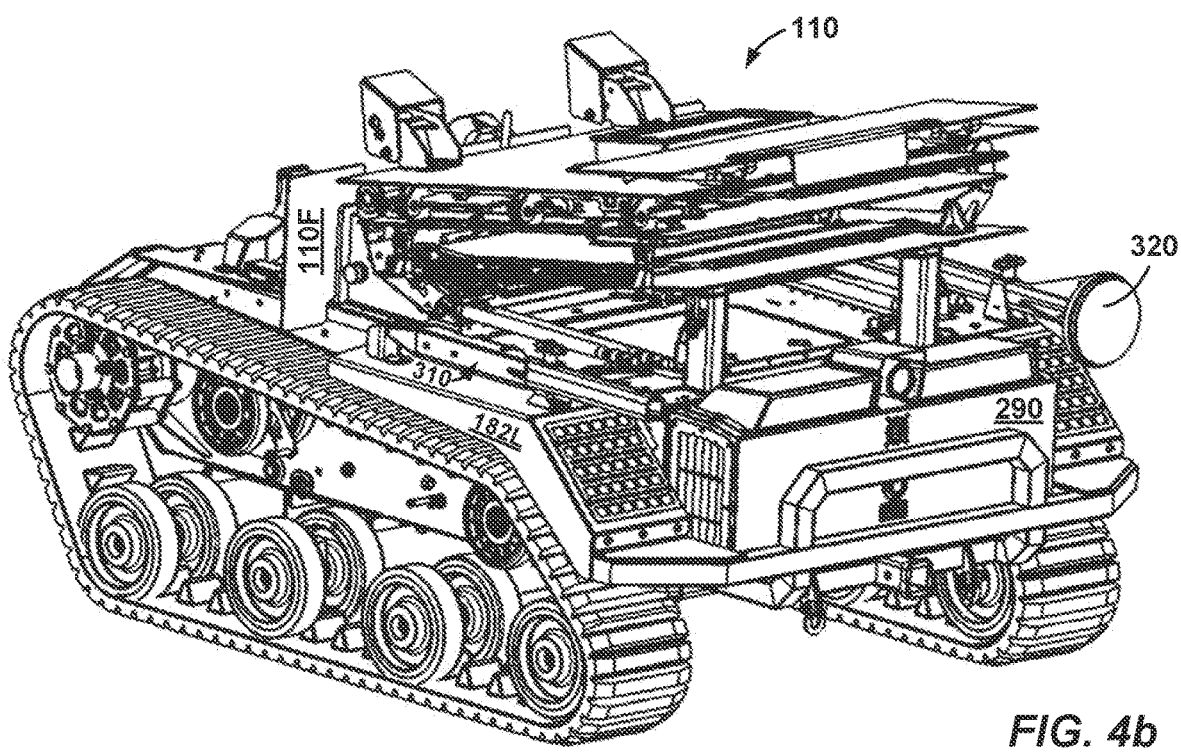

FIG. 4b shows the ballistic shield in the stowed position. For example, the latches 140 of FIG. 1 are released and the folded-in shield is rotated back, about axle 230 and against the lifting torque applied by torsion springs 220. The laid-down shield may then be secured in the stowed position by securing member 280.

Figure 5:
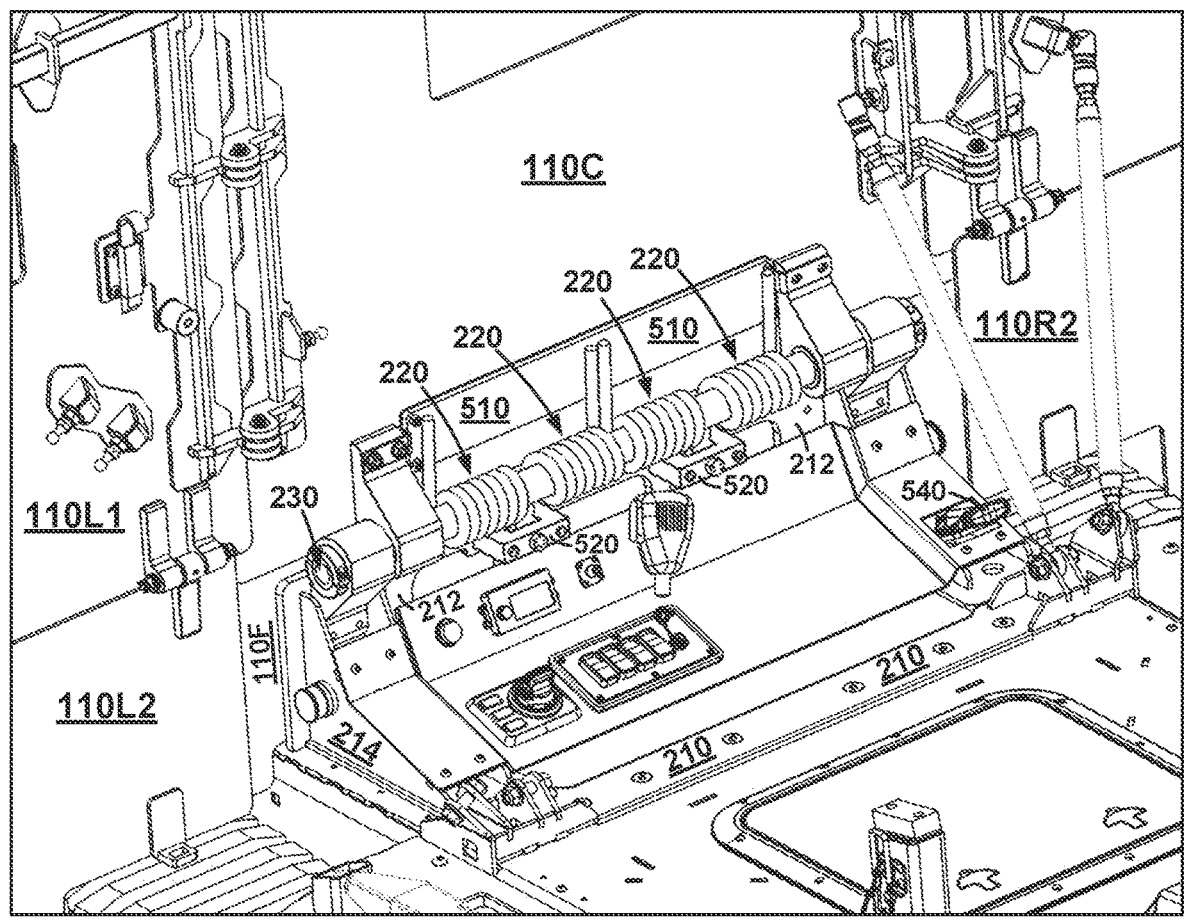
FIG. 5 is a rear-left isometric view of an example hinged attachment of a center armored panel of the ballistic shield to the base.
Figure 6:
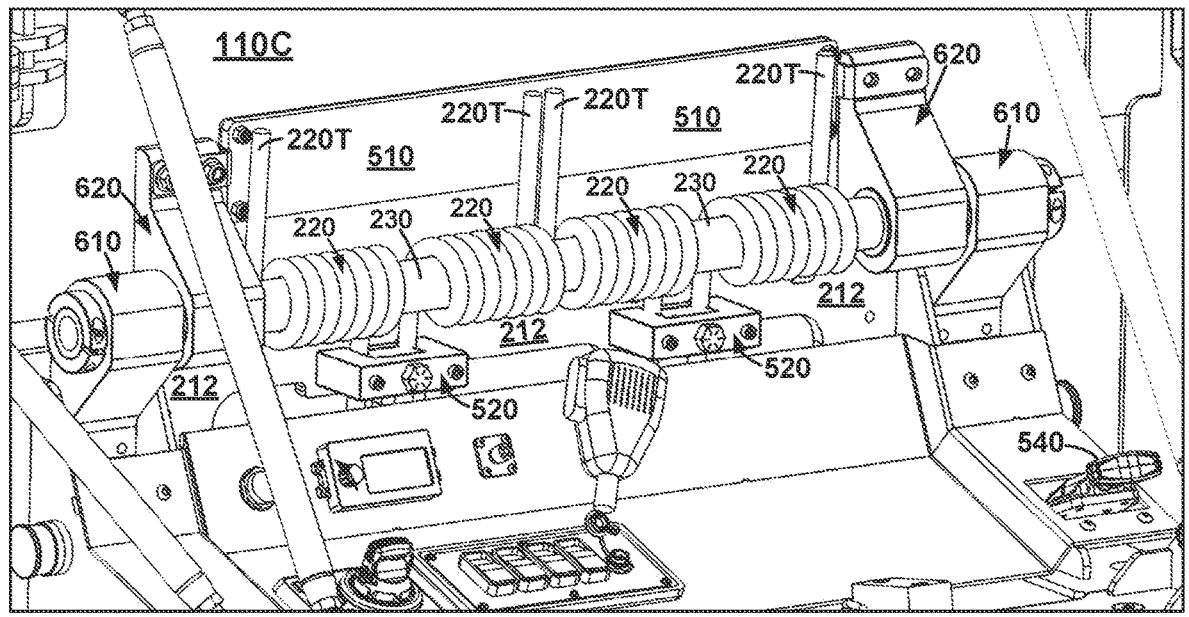
FIG. 6 is a magnified rear-left isometric view of the hinged attachment of FIG. 5.
Figure 7:
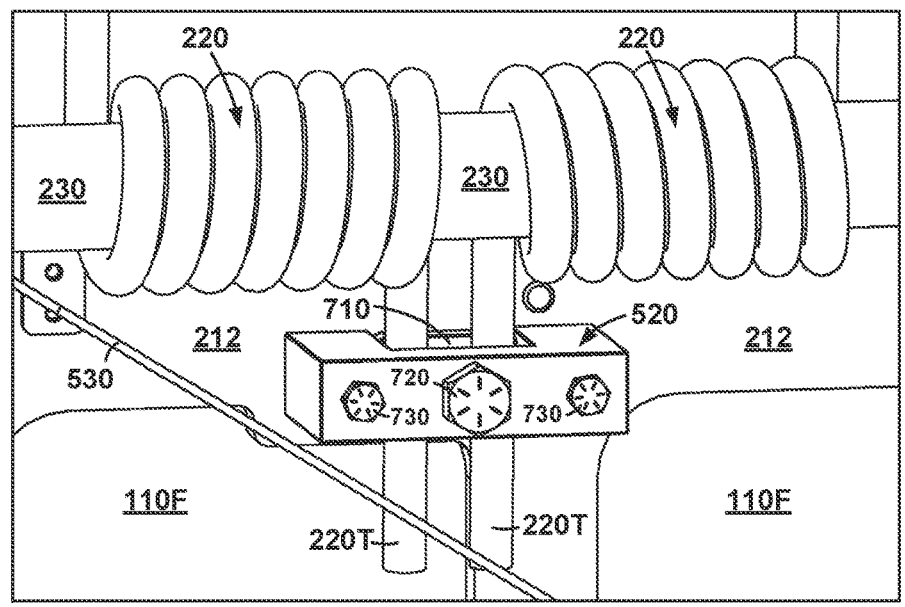
FIG. 7 is a further magnified rear-left isometric view of the hinged attachment of FIG. 5, showing an example adjustable pre-load device for securing torsion springs to a vertical support.

FIGS. 5-7 show additional features of the axle 230 and torsion springs 220. As shown in FIG. 6, the axle 230 is attached to a top portion of the vertical support 212 by axle retainers 610. The axle 230 is also attached to a bottom portion of the central armored panel 110C by axle retainers 620. Any number of torsion springs may be used, depending on load requirements, strength of the springs, and available space. Each torsion spring 220 has two tails 220T, one tail that presses against a backing plate 510 affixed to the central armored panel 110C, and another tail held by an adjustable pre-load device 520, which is attached to vertical support 212.

In an example, the torsion springs 220 are held in compression throughout their entire range of action, i.e., throughout the entire range between the upright, deployed position and the laid-down, stowed position. The torsion springs 220 typically have a neutral position at 180 degrees, where they exert no force in either direction. As best seen in FIG. 7, the tension on torsion springs 220 when the shield 110 is fully upright may be set by threading a central bolt 720 to varying degrees into a pre-tensioning plate 710 of the adjustable pre-load device 520. As the bolt 720 is advanced, the plate 710 is pulled back, deflecting the illustrated tails 220T backwards and applying tension to the springs 220. Screws 730 hold the adjustable pre-load device 520 firmly to the vertical support 212. Maintaining some tension on the springs 220 when the shield is fully upright provides for smooth motion and avoids rattling of the shield 110.

Figure 9:
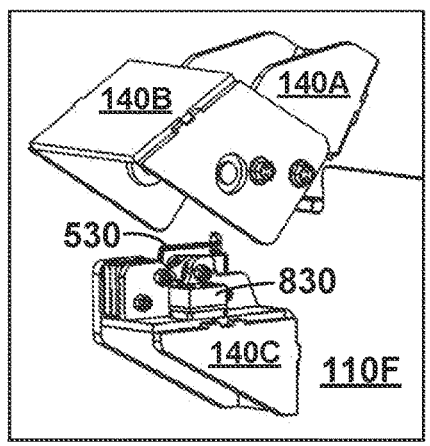
FIG. 9 is a front-left close-up view of an example latch of FIG. 8 with a protective cover in place.
Figure 10:
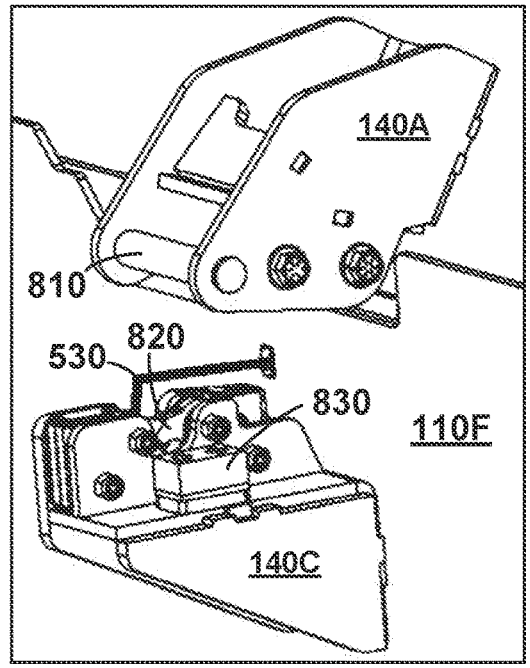
FIG. 10 is a front-right close-up view of an example latch of FIG. 8 without the protective cover.

As shown in FIGS. 5 and 6, a latch release for the latches 140 may be provided via cables 530 and release handle 540 (cables best seen in FIGS. 9 and 10). For example, one cable 530 is provided for each latch 140, and both cables 530 terminate in the same handle 540. Pulling on the handle 540 thus releases both latches, and allows the shield to be laid down, e.g., rotated about the axle 230 from the upright position to the stowed position.

Figure 8:
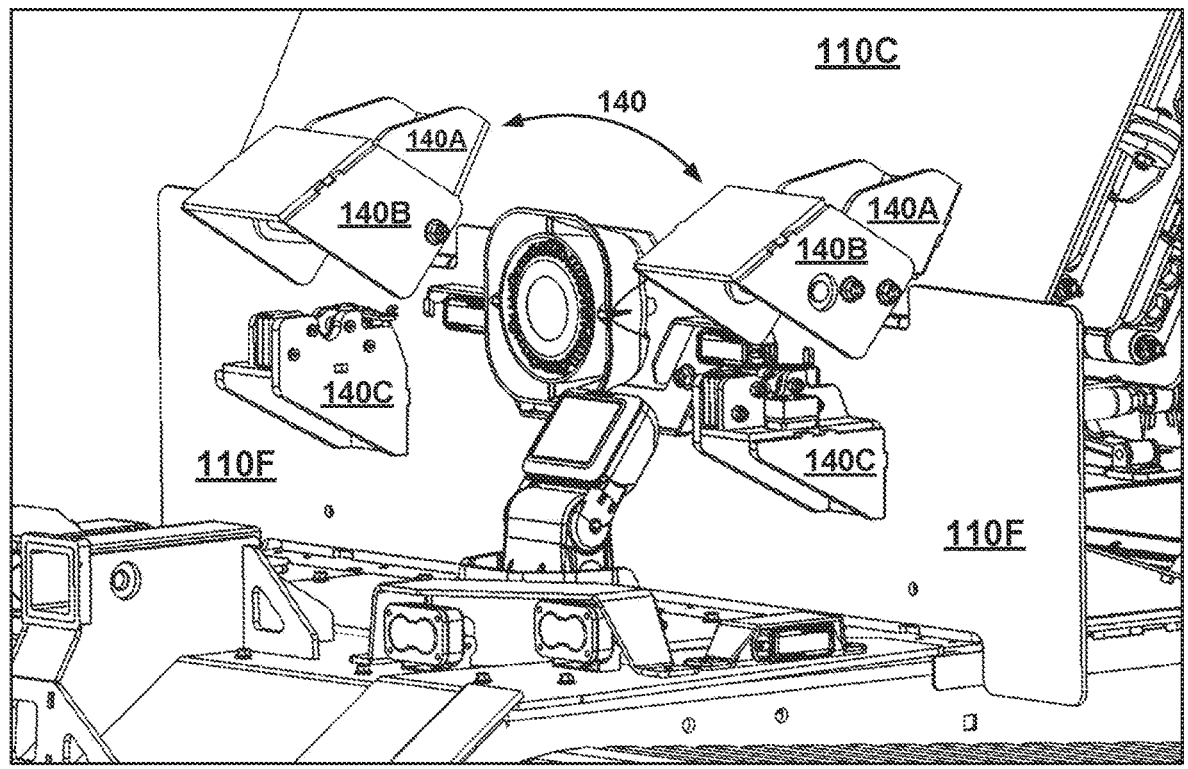
FIG. 8 is a front-left isometric view in which the ballistic shield is in a partially folded-back position, revealing an example set of latches for securing the ballistic shield to the vertical support.

FIGS. 8-10 show the example latches 140 of FIG. 1 in additional detail. Here, each latch 140 is seen to include three main parts, a first part 140A attached to the central armored panel 110C, a second part 140B covering the first part 140A, and a third part 140C fixedly attached to the front armored panel 110F. The second part 140B, which is shown in FIGS. 8 and 9 but hidden in FIG. 10, provides armor for protecting the latch 140. When a latch 140 is pushed closed, a bar 810 within the second component 140B pushes against a hooked component 820 within the third portion 140C. The hooked component 820 and rotates back against a spring force and then snaps back and locks around the bar 810. Once engaged, the fastener 140 can only be released by pulling back on the hooked component 820, which may be accomplished using a release cable 530 and handle 540. In an example, a bump stop 830, such as a rubber bumper, may be used to cushion the closure of the latch 140 and to prevent rattling. Preferably, two latches are used, rather than just one, to provide added strength and redundancy; however, some embodiments may use only a single latch. Other embodiments may include greater than two latches.

Figure 11:
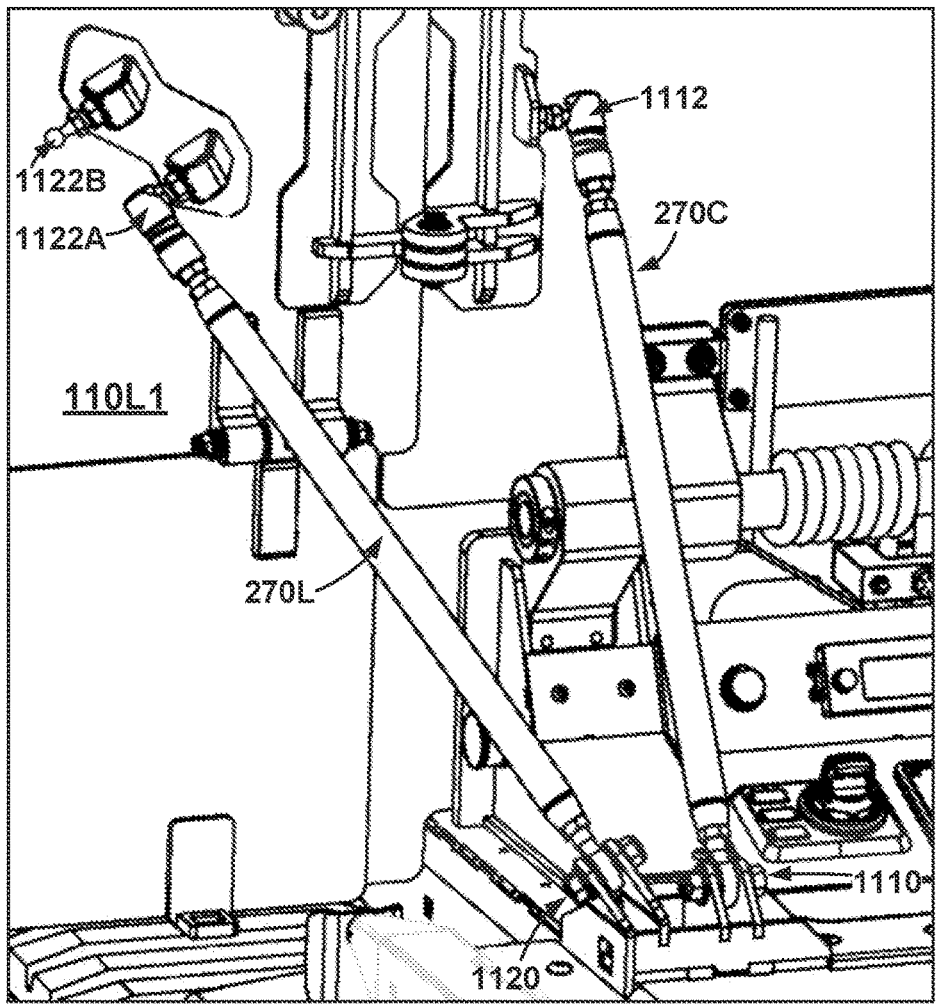
FIG. 11 is a rear-left isometric closeup view of an example pair of support members for securing the ballistic shield in the upright, deployed position, either with the lateral armored panels fully opened and parallel to the central armored pane, or with the lateral armored panels partially folded back.
Figure 12:
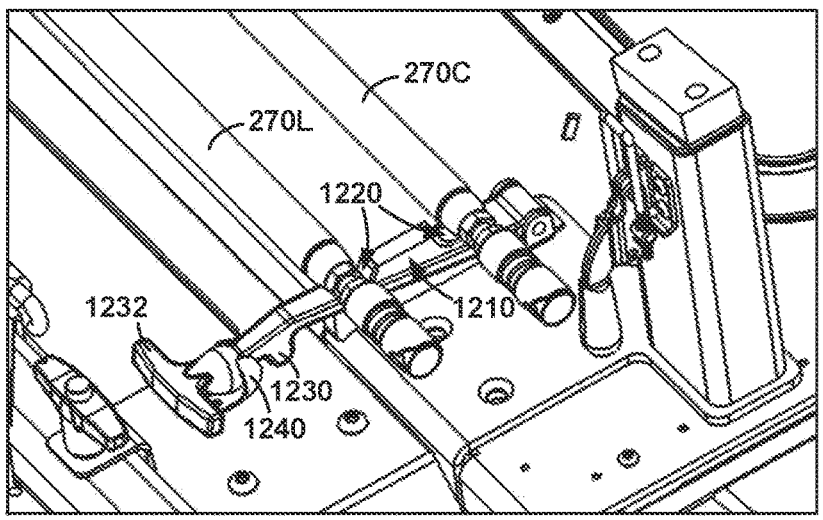
FIG. 12 is a rear-left isometric closeup view of an example strap for securing the support members of FIG. 11.

FIGS. 11 and 12 show example features of the support member 270 in additional detail. As shown in FIG. 11, support members may be provided on each side of the shield 110, a central support member 270C and a lateral support member 270L. The central support member 270C attaches between a base 1110, such as a hinge joint attached to the base plate 210, and an attachment point 1112 on the central armored panel 110C. The central support member 270C thus provides additional support for holding the ballistic shield 110 upright. The lateral support member 270L attaches between a base 1120, and one of multiple attachment points on the lateral armored panel 110L. In the example shown, two attachment points 1122A and 1122B are provided, which hold the armored panel 110L in a fully open position, parallel to the central armored panel 110C. However, attaching the support member 270L to attachment point 1122B holds the armored panel 110L in a partially folded position, such as at an angle ranging between near 0 to 45 degrees. In the example shown, the angle of the lateral panel 110L relative to the central armored panel 110C when using attachment point 1122B is 30 degrees. Although only two lateral attachment points 1122A and 1122B are shown, some embodiments may include greater than two attachment points, so as to provide additional angle choices.

As shown in FIG. 12, support members 270C and 270L may be stowed when not in use. For example, support members may be placed into respective seats 1220 and secured in place via strap 1230, such as a rubber strap or a strap made of some other elastic material. In an example, the strap has a handle 1232, which may be pulled to extend the strap over the ends of the support members. The handle 1232 may then be retained in a locked-down position by receiver 1240.

Figure 13:
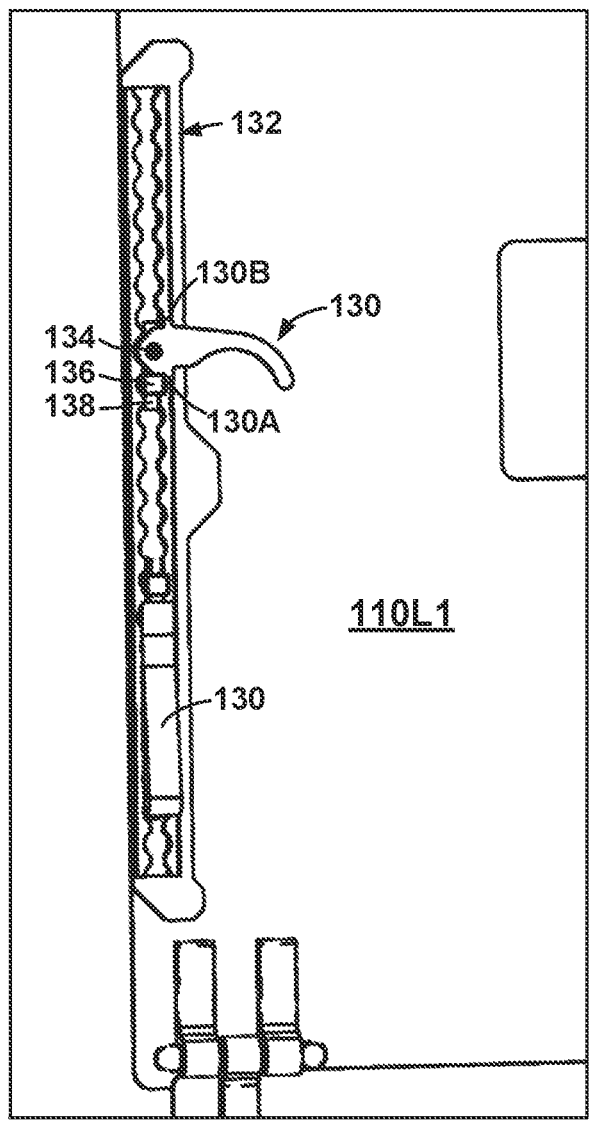
FIG. 13 is a rear-left view of an example track to which accessories can be mounted at adjustable heights.

FIG. 13 shows example features of the accessories 130 and track 132 of FIGS. 1 and 2 in additional detail. Here, the track 132 may be provided as an O-track or L-track, which supports indexed positioning of a car 138 along its length. The car 138 is attached to an accessory 130, such as a gun rest, strap, or handle, via a pivot 134, such as a screw or bolt. A plunger 136 may be pressed to enable movement of the car 138 up and down the track 132. When the plunger 136 is released, the car 138 becomes locked in place.

When provided as a gun rest (as shown at the top of the figure), the accessory 130 may include first and second stops 130A and 130B. The gun rest may be rotated about the pivot 134 up to a respective limit imposed by a respective stop bumping into the plunger 136. A nylon strap is show at the bottom of the figure.

Figure 14A:
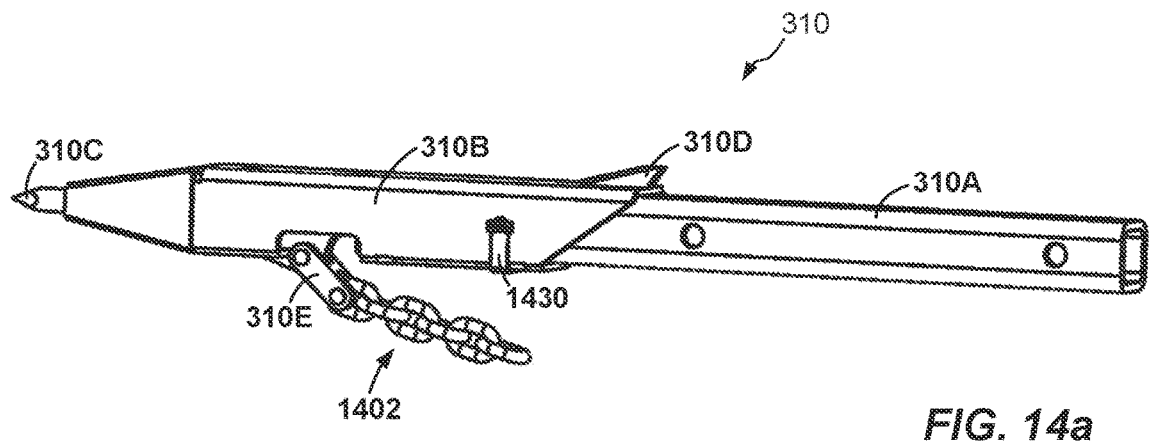
FIGS. 14a, 14b, and 14c are respective views of an example harpoon that may be used in certain embodiments.
Figure 14B:
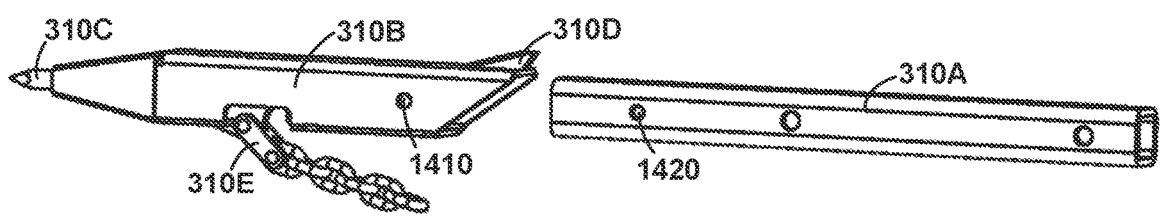
Figure 14C:
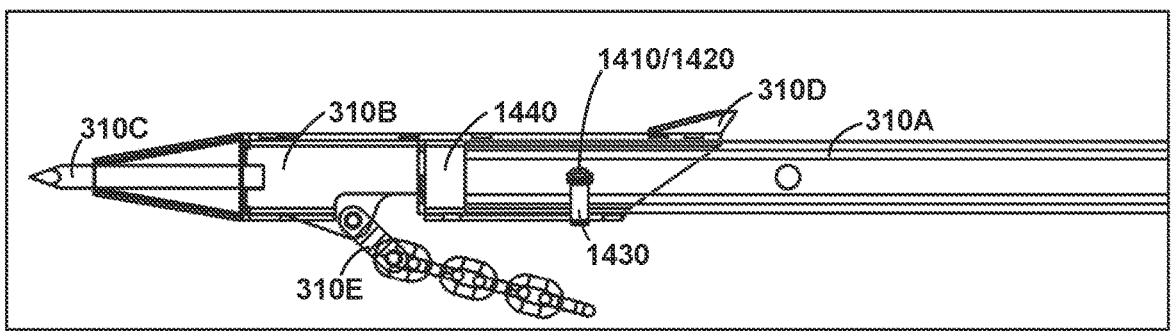

FIGS. 14a, 14b, and 14c show example features of the harpoon 310 in additional detail. Here, the harpoon 310 is seen to include three main portions, a main shaft 310A, a detachable head 310B, and a tip 310C, such as a sharp tip made of hardened steel. The harpoon 310 may further include a fin 310D (e.g., a dorsal fin) and a link 310E. The link 310E is configured to attach to a chain 1402, which may connect back to a tiedown point 170 on the vehicle 100. The components are sized such that the main shaft 310A fits partially within the detachable head 310B, e.g., the main shaft 310A is able to move forward and back to some degree within the detachable head 310B.

As shown in FIG. 14b, the detachable head 310B has a hole 1410, which may be a pair of opposing holes on opposite sides of the detachable head 310B. The main shaft 310A also has a hole 1420, which may also be a pair of opposing holes on opposite sides of the main shaft 310A. As shown in FIG. 14c (a transparent view), the holes 1410 and 1420 may be lined up and a breakable link 1430, such as a tie wrap, may be inserted through the lined-up holes and secured in place. A space 1440 is provided in front of the main shaft 310A. The space 1440 leaves room for the shaft 310A to slide forward and break the link 1430, e.g., by action of shear stress.

In example operation, the harpoon 310 is inserted into the front accessories hitch 150 (FIG. 1) of the vehicle 100, and the vehicle 100 is driven forward such that the tip 310C of the harpoon 310 pierces and enters a target, such as the side of an automobile. Upon impact, the vehicle 100 pushes the main shaft 310A forward into the space 1440, breaking the link 1430. The vehicle 100 can then back up, causing the main shaft 310A to withdraw from the head 310B, leaving the head 310B inside the target. As the vehicle 100 continues to back up, the chain 1402 connected to the link 310E tightens and pulls back. Tension from the chain tends to flatten the head 310B against an interior surface of the target, providing a secure hold on the target and enabling the vehicle 100 to drag away the target as the vehicle 100 continues to reverse.

An improved technique has been described for facilitating deployment and stowing of a ballistic shield 110 on a vehicle 100. The technique includes providing a central armored panel 110C having a hinged connection to a base 210/212, which may be coupled to or integral with the vehicle 100. The hinged connection includes an axle 230 and a set of torsion springs 220 configured to exert a lifting torque on the central armored panel 110C relative to the base 210/212, such that the central armored panel 110C is movable about the hinged connection for assuming both an upright, deployed position (FIGS. 1-3) and a laid-down, stowed position (FIG. 4b).

Having described certain embodiments, numerous alternative embodiments or variations can be made. For example, the deployable ballistic shield 110 may be provided as a permanent, integrated feature of a vehicle. Alternatively, the deployable ballistic shield 110 may be provided as a kit or add-on for an existing vehicle. For example, customers can purchase a ballistic-shield package for their own vehicles and can install the package onto their vehicles using existing surfaces for receiving components.

Also, although embodiments have been described for electrically powered vehicles, the disclosure is not limited to electric vehicles but may be used by vehicles powered by any means, such as electricity, gasoline, diesel, hydrogen, or the like.

Further, although embodiments have been described as having a particular number and type of armored panels, other numbers or types of armored panels may be used.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

The following table of reference characters points out specific features of the drawings and their relationship to the features described herein:

Table of reference characters

| Reference Numeral | Description |
|---|---|
| 100 | Robotic vehicle with deployable ballistic shield |
| 102 | Front of vehicle; forward direction |
| 104 | Rear of vehicle, backward direction |
| 110 | Deployable ballistic shield |
| 110C | Central armored panel |
| 110F | Front armored panel |
| 110L | Left lateral armored panel |
| 110L1, 110L2, 110L3 | Left first, second, and third armored portions, respectively |
| 110R | Right lateral armored panel |
| 110R1, 110R2, 110R3 | Right first, second, and third armored portions, respectively |
| 110T | Top armored panel |
| 112 | Bulletproof window |
| 114R, 114C, 114L | Right, center, and left flexible ballistic skirts, respectively |
| 120 | Top hinged connection between top armored panel and central armored panel |
| 130 | Accessory, such as gun rest, strap, handle, etc. |
| 130A, 130B | Upper and lower stops for rotation of gun rest, e.g., against plunger 136 (FIG. 13) |
| 132 | Track, such as O-track or L-track, for attaching accessories, e.g., gun rests, nylon loops, grab handles, etc., at adjustable heights at indexed locations. |
| 134 | Pivot for accessory (e.g., gun rest) on track, such as a screw that threads into car 138 |
| 136 | Plunger, e.g., pushed to enable movement of accessory up and down track |
| 138 | Car, e.g., rides up and down track 132 |
| 140 | Latches, for locking ballistic shield in upright, deployed position |
| 140A | First portion of fastener, fixed relative to central armored panel |
| 140B | Second portion of fastener, joined relative to first portion of latch and spring-loaded toward latched position |
| 140C | Third portion of fastener, fixed relative to front armored panel |
| 150 | Front accessories hitch, e.g., for door breacher and harpoon |
| 160 | Front armor |
| 170 | Tiedown point, e.g., for receiving chain connected to harpoon |
| 180 | Track(s) of vehicle |
| 182R, 182L | Right and left rear fenders, respectively; covers tracks to protect personnel |
| 210 | Base plate |
| 212 | Vertical support; e.g., welded or otherwise firmly attached to the base plate |
| 214 | Gusset(s), reinforce attachment of vertical support to base plate |
| 220 | Torsion spring(s) |
| 220T | Tail(s) of torsion spring(s) |
| 230 | Axle |
| 240 | Lateral hinged connection |
| 242 | Locking bolt(s), locks lateral armored panel(s) in fully open (parallel) position |
| 250 | Lower hinged connection, supports backward folding up of second armored portion against first armored portion |
| 260 | Bottom hinged connection, supports backward folding up of third armored portion against second armored portion |

-continued

Table of reference characters

| Reference Numeral | Description |
|---|---|
| 262 | Latch element, retains third armored portion securely against second armored portion (shown folded up in FIG. 2) |
| 270 | Support member(s), for reinforcing ballistic shield in upright, deployed position |
| 270C | Central support member(s) for attaching between base and central armored panel |
| 270L | Lateral support member(s) for attaching between base and lateral armored panel(s) |
| 280 | Securing member (e.g., for securing ballistic shield in second position) |
| 282 | Bump stop (e.g., rubber or other elastic material), e.g., for cushioning ballistic shield when folded down |
| 290 | Radiator, e.g., for cooling electrical components |
| 292 | Radiator air intake |
| 294 | Radiator air exhaust |
| 310 | Harpoon (also called "dragon tail") |
| 310A | Main shaft of harpoon (FIGS. 14a, 14b, and 14c) |
| 310B | Detachable head of harpoon |
| 310C | Tip of harpoon, e.g., hardened steel |
| 310D | Fin of harpoon, e.g., for resisting withdrawal of head |
| 310E | Link, e.g., for connecting to chain, e.g., for connecting to tiedown point on vehicle |
| 320 | Door breacher |
| 510 | Backing plate for torsion springs against central armored panel |
| 520 | Adjustable pre-load device(s) for torsion springs against vertical support |
| 530 | Cable(s) for releasing latches 140 |
| 540 | Cable release handle |
| 610 | Axle retainer(s), coupled to top of vertical support |
| 620 | Axle retainer(s), coupled to bottom of central armored panel |
| 710 | Pre-tensioning plate, for establishing tension on torsion springs, even when shield is upright |
| 720 | Central bolt, e.g., threaded into pre-tensioning plate for adjusting pre-tension on torsion springs |
| 730 | Screw(s), e.g., threaded into vertical support for attaching pre-tensioning plate to vertical support |
| 810 | Bar of latch |
| 820 | Hooked component of latch |
| 830 | Bump stop for latch (e.g., rubber or other elastic material) |
| 1110 | Base of central support member |
| 1112 | Attachment point for attaching central support member to central armored panel |
| 1120 | Base of lateral support member |
| 1122A | Attachment point for attaching lateral support member at first lateral location, for establishing fully open (parallel) condition of lateral armored panel |
| 1122B | Attachment point for attaching lateral support member at second lateral location, for establishing tilted-back condition of lateral armored panel, e.g., at 45 degrees or less (30 degrees in illustrated example). |
| 1210 | Receiver for support members in stowed position |
| 1220 | Seat(s) for support members, e.g., rubber or other cushioning material |

-continued

Table of reference characters

| Reference Numeral | Description |
|---|---|
| 1230 | Strap for securing support members (e.g., rubber or other elastic material) |
| 1232 | Handle of strap |
| 1240 | Retainer for strap |
| 1402 | Chain |
| 1410 | Hole in head of harpoon |
| 1420 | Hole in main shaft of harpoon |
| 1430 | Breakable link, e.g., tie wrap; normally extends through both hole(s) in head and hole(s) in main shaft |
| 1440 | Space, for allowing movement of main shaft toward tip upon impact with target; allows breakable link to shear. |
| 1450 | Pusher plate, limits forward motion of main shaft into head upon impact and drives tip into target |

What is claimed is:

1. A deployable ballistic shield for a vehicle, comprising:
a base configured to attach to the vehicle;
a central armored panel having a hinged connection to the base, the hinged connection including an axle and a set of torsion springs configured to exert a lifting torque on the central armored panel relative to the base, the central armored panel being movable about the hinged connection for assuming both an upright, deployed position and a laid-down, stowed position; and
a set of lateral armored panels coupled to the central armored panel, each of the set of lateral armored panels being movable for assuming a laterally deployed position and a centrally folded-in position.

2. The deployable ballistic shield of claim 1, wherein the base includes a vertical support, and wherein the axle is attached to the base at a top region of the vertical support.

3. The deployable ballistic shield of claim 1, wherein the set of torsion springs is configured to exert a positive amount of the lifting torque throughout a full range of movement between the upright, deployed position and the laid-down, stowed position.

4. The deployable ballistic shield of claim 1, further comprising a set of latches configured to lock the central armored panel in the upright, deployed position.

5. The deployable ballistic shield of claim 4, wherein the set of latches includes first and second latches configured to engage automatically when the central armored panel is moved from the laid-down, stowed position to the deployed position.

6. The deployable ballistic shield of claim 4, further comprising a latch release configured to release the set of latches, the latch release including a set of cables that runs from the set of latches to an area behind the central armored panel when the central armored panel is in the upright, deployed position.

7. The deployable ballistic shield of claim 1, further comprising a set of support members, each support member having a first end coupled to the base and a second end constructed and arranged to assume (i) a first position in which the second end is coupled to the central armored panel and (ii) a second position in which the second end is coupled to the base.

8. The deployable ballistic shield of claim 7, further comprising a set of lateral support members, each lateral support member having a first end coupled to the base and a second end constructed and arranged to assume (i) a bolstering position in which the second end is coupled to a respective lateral armored panel of the set of lateral armored panels and (ii) a stowed position in which the second end is coupled to the base.

9. The deployable ballistic shield of claim 8, wherein the second end is constructed and arranged to attach to the respective lateral armored panel at multiple locations, the locations including a first location at which the respective lateral armored panel is substantially parallel to the central armored panel and a second location in which the respective lateral armored panel is angled backwards relative to the central armored panel.

10. The deployable ballistic shield of claim 1, further comprising a respective locking bolt constructed and arranged to lock each of the set of lateral armored panels in the laterally deployed position.

11. The deployable ballistic shield of claim 1, wherein each of the set of lateral armored panels is movable relative to the central armored panel about a respective lateral hinged connection.

12. The deployable ballistic shield of claim 1, further comprising a top armored panel having a top hinged connection to the central armored panel, the top armored panel constructed and arranged to provide ballistic shielding above the central armored panel.

13. The deployable ballistic shield of claim 1, wherein each of the set of lateral armored panels includes:
 a first armored portion hingedly attached to the central armored panel;
 a second armored portion hingedly attached to the first armored portion; and
 a third armored portion hingedly attached to the second armored portion.

14. The deployable ballistic shield of claim 13, wherein the third armored portion is constructed and arranged to assume both (i) a deployed position in which the third armored portion is folded down from the second armored portion to provide ballistic shielding below the second armored portion and (ii) a stowed position in which the third armored portion is folded up and secured to the second armored portion.

15. The deployable ballistic shield of claim 1, wherein at least one panel of the set of lateral armored panels includes a vertical track disposed at an outside edge of the panel, the vertical track providing multiple vertical locations at which to attach accessories.

16. The deployable ballistic shield of claim 15, wherein the accessories to be attached to the vertical track include at least one of a gun rest or a hand grip or strap.

17. A vehicle having a deployable ballistic shield, comprising:
 a base formed on one or more surfaces of the vehicle;
 a central armored panel having a hinged connection to the base, the hinged connection including an axle and a set of torsion springs configured to exert a lifting torque on the central armored panel relative to the base, the central armored panel being movable about the hinged connection for assuming both an upright, deployed position and a laid-down, stowed position; and
 a set of lateral armored panels coupled to the central armored panel, each of the set of lateral armored panels being movable for assuming a laterally deployed position and a centrally folded-in position.

18. The vehicle of claim 17, wherein the vehicle is tracked vehicle and further comprises:
 a first track;
 a second track;
 a first fender that covers a portion of the first track behind the deployable ballistic shield when the deployable ballistic shield is in the upright, deployed position; and
 a second fender that covers a portion of the second track behind the deployable ballistic shield when the deployable ballistic shield is in the upright, deployed position.

19. The vehicle of claim 17, wherein the vehicle is a robotic vehicle powered entirely by electricity.

20. The vehicle of claim 19, further comprising a radiator constructed and arranged to cool electrical components of the vehicle, the radiator disposed at a rear of the vehicle and having a top, a left side, and a right side, the vehicle including:
 an air intake disposed at the top of the radiator; and
 first and second air exhausts disposed at the left side and right side of the radiator, respectively.

\* \* \* \* \*